(12) United States Patent
Freach et al.

(10) Patent No.: US 6,710,788 B1
(45) Date of Patent: Mar. 23, 2004

(54) GRAPHICAL USER INTERFACE

(75) Inventors: Jon E. Freach, Dallas, TX (US);
Robert Moore, Chicago, IL (US);
Kenneth A. Fuiks, Fremont, CA (US);
Kevin D. Davis, Belton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1329 days.

(21) Appl. No.: 08/759,899

(22) Filed: Dec. 3, 1996

(51) Int. Cl.[7] .............................................. G06K 15/00
(52) U.S. Cl. ....................................... 345/778; 345/782
(58) Field of Search ................................ 395/339, 326, 395/328, 340, 341, 342, 348, 349, 350, 351, 355, 356, 357; 345/419; 324/418

(56) References Cited

U.S. PATENT DOCUMENTS

| | | | |
|---|---|---|---|
| 5,414,801 A | * 5/1995 | Smith et al. ................. 345/419 |
| 5,515,486 A | * 5/1996 | Amro et al. ................. 345/437 |
| 5,546,002 A | * 8/1996 | Hickl ........................ 324/418 |
| 5,678,015 A | * 10/1997 | Goh ........................... 345/340 |
| 5,715,416 A | * 2/1998 | Baker ........................ 345/349 |

* cited by examiner

*Primary Examiner*—Steven Sax
(74) *Attorney, Agent, or Firm*—Ronald O. Neerings; W. James Brady, III; Frederick J. Telecky, Jr.

(57) ABSTRACT

A graphical user interface uses a representation of a polyhedron, such as a cube (44), having images on each face (46) for representing multiple desktops used in conjunction with an operating system. By pressing on faces of the cube (44), the computer switches to the selected desktop (42). The cube (44) may be rotated to allow the user to select from an unlimited number of desktops (42).

29 Claims, 10 Drawing Sheets

GRAPHICAL USER INTERFACE

BACKGROUND OF THE INVENTION

1. Technical Field

This invention relates in general to computers and, more particularly, to a graphical user interface.

2. Description of the Related Art

As the popularity of personal computers has grown, software companies have strived to improve the interaction between users and the computer. Early operating systems used text-based interfaces supplied with the operating systems, such as CP/M and DOS. These text based operating systems relied on the user to memorize commands and have a detailed knowledge of the contents of the computer.

Text-based interfaces have been largely replaced by graphical user interfaces (GUIs). A graphical user interface allows the user to interact with the computer through use of an input device, such as a mouse, touchpad, trackball, or joystick (or through the keyboard). The input device allows the user to initiate actions by pointing at an object on the screen and "clicking" (pressing a control button associated with the input device).

Graphical user interfaces are generally supplied by the operating system provider, and also by third parties who design specialized or enhanced interfaces. For example, WINDOWS 95 (by Microsoft Corporation) provides a graphical user interface which is used to control interaction between the user and the operating system and also provides support to applications software, such that each application has a similar look and feel. Third party vendors also provide software which modifies or replaces the portions of the WINDOWS 95 graphical user interface which controls interaction between the user and the operating system. NORTON NAVIGATOR, by Symantec Corporation, enhances the taskbar area of the WINDOWS 95 graphical user interface to provide additional areas to access programs and to provide multiple "desktops." A desktop is an arrangement of graphical elements shown on the user's screen, such as backgrounds ("wallpaper"), icons, and open application windows. Providing multiple desktops allows the user to configure interface elements differently for various work conditions.

While multiple desktops provides functionality improvements over the default graphical user interfaces provided with the various operating systems, the graphical user interface remains an impediment to users, and especially to less experienced users.

Therefore, a need has arisen for a powerful, yet easy to use, graphical user interface.

SUMMARY OF THE INVENTION

The present invention provides a method of switching desktops on a computer. The GUI displays a representation of a polyhedron having a plurality of faces shown on the computer's display. Images are displayed on the faces, each image being associated with a respective desktop. The desktops may be switched responsive to user interaction with said faces.

The present invention provides significant advantages over the prior art. First, the GUI present an easy and intuitive approach to using multiple desktops. Second, the GUI can support an unlimited number of desktops without reducing the resolution and, hence, visual impact of the bitmaps representing the desktops. Third, the GUI uses only a small portion of the desktop and virtually no space on the taskbar.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1b, 1c, 1d and 1e illustrate a prior art enhancement to the graphical user interface of FIG. 1a;

DETAILED DESCRIPTION OF THE PREFERRED EMBODIMENT

Figure 1A:
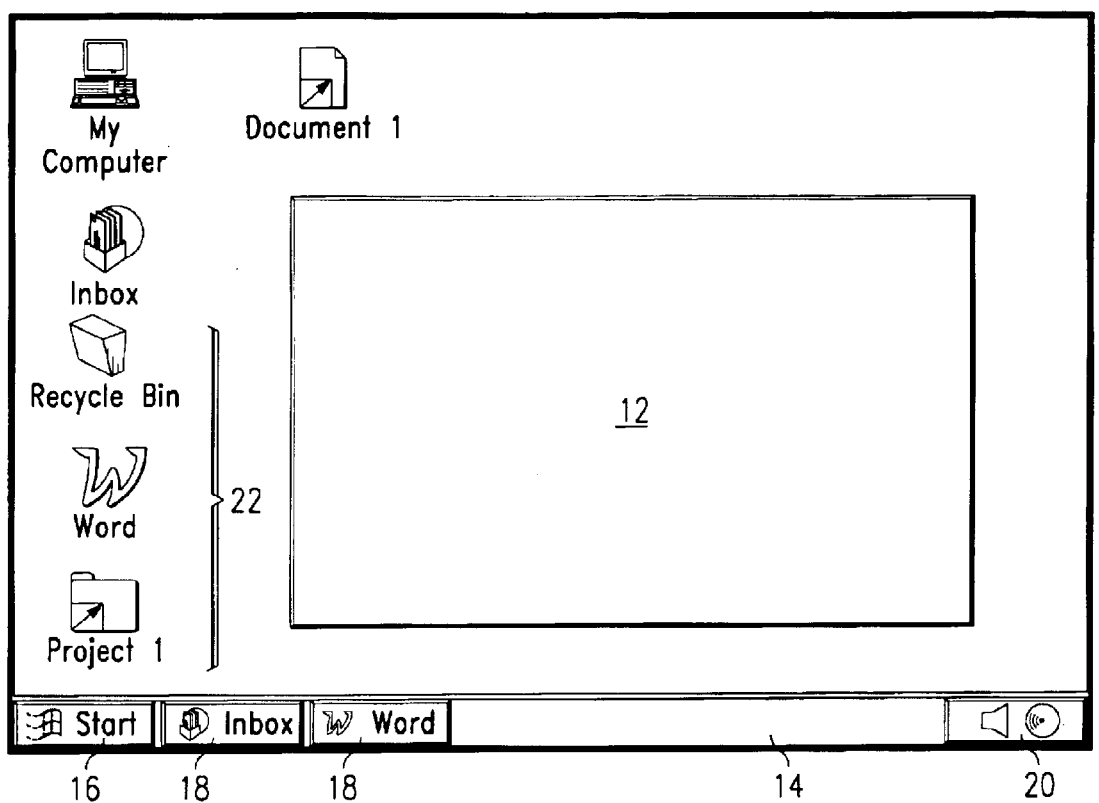
FIG. 1a illustrates a first prior art graphical user interface.

The present invention is best understood in relation to FIGS. 1–11 of the drawings, like numerals being used for like elements of the various drawings.

FIG. 1 illustrates a prior art graphical user interface (GUI) 10. This particular interface is used by WINDOWS 95. The interface includes a background 12, which is typically a static (i.e., no interactive objects) bitmap image which is either centered (as shown in FIG. 1) or tiled. In a tiled background the bitmap image is repeated, starting in the upper left hand corner, to fill the entire screen. A taskbar 14 includes a number of elements. A "Start" button 16 provides access to programs and documents using a cascading menu system. If any programs are active, associated program buttons 18 are located to the right of the Start button 16. In FIG. 1, two such program buttons 18 are shown. By clicking on a program button 18, the associated program window is brought to the top of the desktop. When a program is minimized, its associated program button 18 becomes its visual representation on the desktop.

The tray area 20 is used by certain programs in place of a program button 18. If a program is minimized to the tray area 20, only a miniaturized bitmap of its icon remains. The tray area is typically used by utility programs, such as the volume control and CD player interface.

The taskbar 14 can be moved to any edge of the display, by clicking and holding on an used portion of the taskbar and dragging to the desired edge. The size of the taskbar 14 can be increased to hold multiple rows of programs buttons 18.

The desktop can also hold a plurality of icons 22. Desktop icons 22 may represent any type of file, including program files, a shortcut (i.e., a file which has a pointer to another file), documents and folders. By double clicking on a program file, the program is run. By double clicking on a document file, a program associated with the file is initiated and the document is loaded. Double clicking on a folder icon displays the contents of an associated directory on the hard drive. Double clicking on a shortcut has the same effect as double clicking on the file to which the shortcut points.

Icons 22 can be freely arranged on the desktop. A typical use is to provide desktop icons 22 for the most-used applications and documents to avoid use of the cascading menus.

The prior art shown in FIG. 1 has significant problems with regard to ease of use. If a user places icons 22 for all commonly used applications, documents and folders (or, more commonly, shortcuts to the applications, documents and folders) on the desktop, the icons become difficult to distinguish from one another and more difficult to use than the cascading menus.

A second prior art GUI 24 is shown in FIGS. 1b–1e. This GUI is sold by Symantec Corporation as NORTON NAVIGATOR. It is discussed herein as an example of a multi-desktop GUI which works in conjunction with the WINDOWS 95 GUI.

Figure 1C:
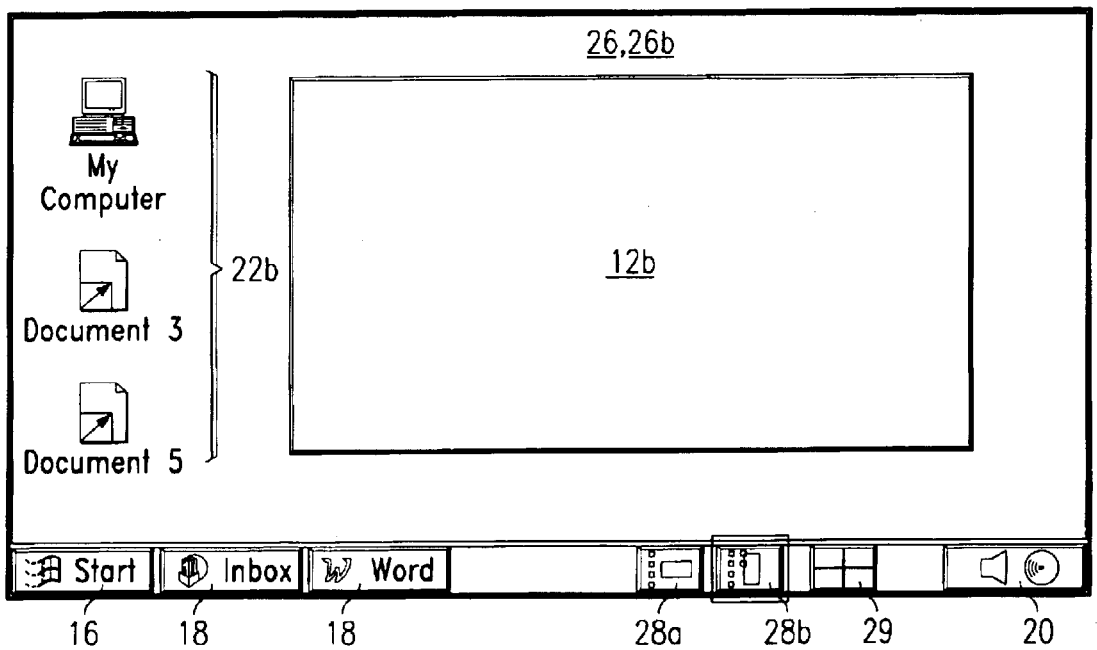
Figure 1B:
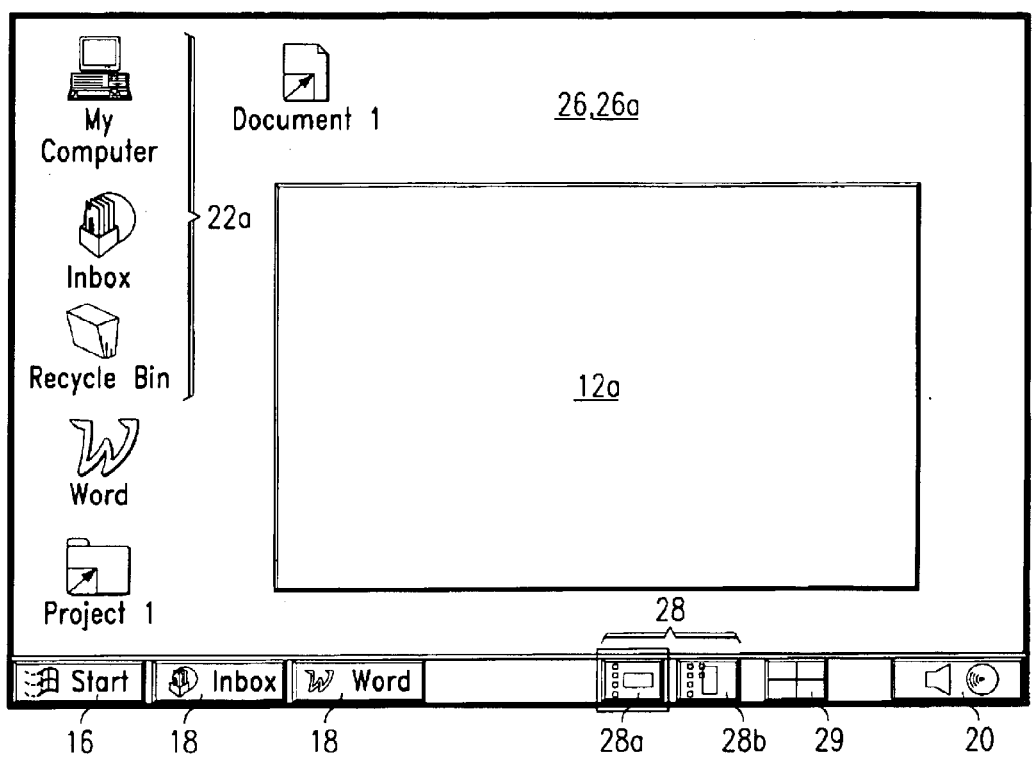

The GUI 24 supports one or more desktops 26 which may be individually configured by the user. FIG. 1b illustrates a first desktop 26a and FIG. 1c illustrates a second desktop 26b. The user can switch desktops by pressing on a desktop button 28 (individually referenced as first desktop button 28a and second desktop button 28b). When a desktop button is selected it appears depressed; for illustration purposes, a rectangle is drawn around the selected desktop buttons in FIGS. 1b–c. Each desktop 26 may have a different color, different wallpaper 12 (shown as wallpaper 12a for first desktop 26a and as wallpaper 12b for desktop 26b) and different icons 22 (shown as icons 22a for first desktop 26a and as icons 22b for desktop 26b). Each desktop, however, must use the same screen resolution. Also, the taskbar 14 remains the same as desktops are switched.

NORTON NAVIGATOR also adds a quicklaunch area 29 where commonly used programs or documents can be accessed on the toolbar. Quicklaunch area 36 is similar to the tray area 20, but is user configurable.

Figure 1D:
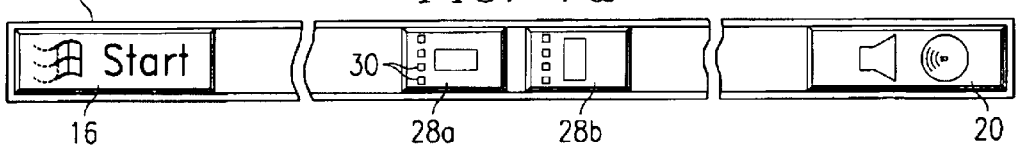
Figure 1E:
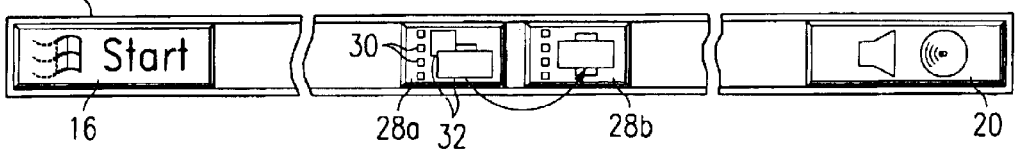

In operation, the user may set up one desktop 26 with a first set of icons, wallpaper and color and a second desktop 26 with second set of icons, wallpaper and color. As shown in FIGS. 1d and 1e, each desktop button 28 provides a "thumbprint" of each desktop, showing the desktop color, a reduced resolution image of the wallpaper, icons blocks 30 representing each icon on the associated desktop, and rectangles 32 representing open application windows on the associated desktop (see FIG. 1e). Open application windows 32 can be moved from one desktop to another by dragging the associated rectangle 32 from one desktop button 28 to another desktop button 28. FIG. 1e illustrates the movement of an open application window from the first desktop 26a to the second desktop 26b. Icons can be moved from one desktop to another by dragging the icon 22 from an active desktop to a desktop button 28.

The area of the taskbar 14 in which the desktop buttons 28 are placed must be shared with, at a minimum, the Start button, 16, the program buttons 18 and the tray area 20. The height of each desktop button 28 is limited by the height of the taskbar 20. With the taskbar set at a height of two rows of program buttons 18, the height of a desktop button is approximately ½ inch on a 17" screen at 1024×768 resolution. Once the number of desktop buttons 28 exceeds the available space on the taskbar (about five in a typical configuration), however, the height of the program buttons 28 is cut in half to allow more buttons on the screen. As the size of the desktop button decreases, so does its visual significance. Further, the visual image of a desktop button 28 is obscured by open application windows; if an application is running full screen, the desktop button 28 of the desktop running the application appears all white.

Consequently, as more desktops are added, their visual impact is diminished and their functionality is accordingly reduced. Further, the desktop buttons 28 use a large area of the taskbar 14, reducing the amount of taskbar space available for the program buttons 18 and tray area 20.

Figure 2:
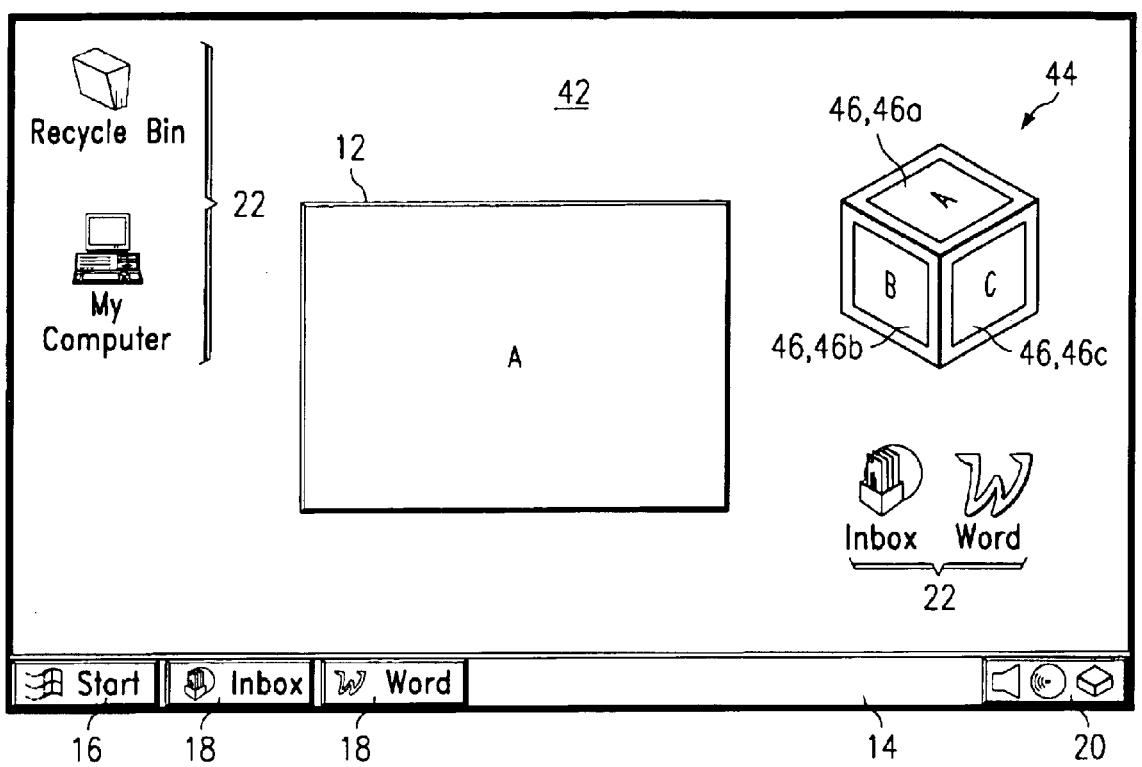
FIG. 2 illustrates a polyhedron shaped graphical user interface for controlling a multi-desktop environment.

FIG. 2 illustrates a GUI 40 which is easier to use than prior art GUIs and supports unlimited desktops with full visual impact. In the preferred embodiment, the GUI 40 not only supports multiple desktops, but also supports multiple workspaces. Whereas desktops differ only in their visual appearance and different sets of icons and active program windows, a workspace takes into account the environment of the computer. Accordingly, a computer may be connected to a network, a docking station and multiple laser printers, when used in the office environment, the same computer may be connected only to an inkjet printer in the home environment. Thus, when used with software which can distinguish different environments, the GUI described herein can communicate with the environmental manager software to detect and react to changes in resources. For purposes of illustration of operation, the GUI 40 will be discussed in connection with management of desktops, although many features could apply to other workspace changes as well.

The GUI 40 changes desktops 42 responsive to user interaction with a multi-faced desktop object 44 (hereinafter cube 44). While a cube showing three of its faces 46 (individually referenced as faces 46a, 46b and 46c) is used herein, other multi-faced objects such as tetrahedron-, octahedron- or other polyhedron-shaped objects could also be used. A miniaturized bitmap of the cube is also placed in the tray area.

Each desktop can have a unique set of desktop icons 22, icon arrangement, wallpaper 12, and color scheme. The user controls the active desktop 42 by selecting a desired desktop from the cube 44, as will be discussed in greater detail hereinbelow. The cube 44 provides a visual representation of a desktop on each of its faces 46. In FIG. 2, the image on each face 46 is indicated by a letter (for example, "A", "B" or "C"), with the corresponding wallpaper 12 similarly labeled. In actual use, the faces 46 would provide a bitmap image to identify the desktop (see FIG. 3). The uppermost face 46a indicates the active desktop 42. The remaining faces 46b and 46c are used to switch to a different desktops which are not currently active. It should be noted that the "active" desktop 42 is the desktop which is currently being viewed by the user; the remaining desktops may be supporting applications which are active but unseen by the user.

To switch to a different desktop, the user can simply click on one of the inactive faces 46b or 46c (alternative methods for switching desktops are discussed below). To expose desktops not currently accessible through the three faces currently being displayed, the cube can be rotated (see FIGS. 6a–d).

Figure 3:
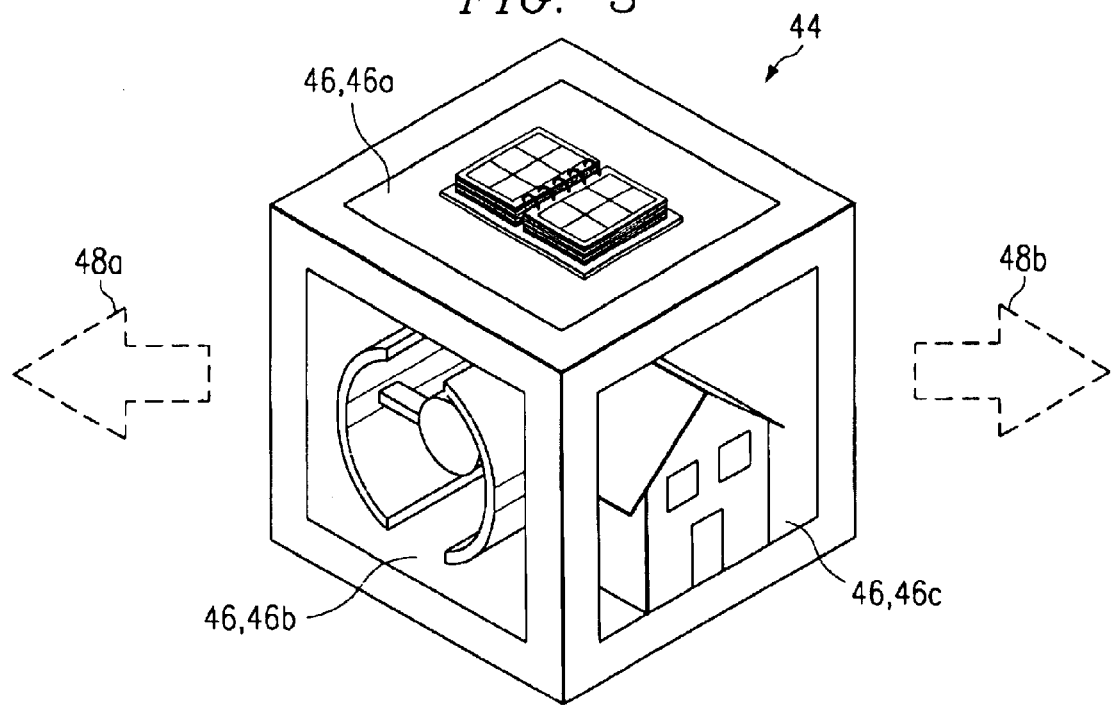
FIG. 3 illustrates a detailed view of a cube used in the interface of FIG. 2.

The cube 44 is shown in greater detail in FIG. 3. Each face 46 has a bitmap image (shown in proper perspective depending upon the associated face 46a, 46b, or 46c). For example, the active desktop face 46a has a bitmap of an appointment book, which would be appropriate for a scheduling desktop. Face 46b has a space ship bitmap, which would be appropriate for a desktop for playing games. Face 46c has a house bitmap, which would be appropriate for using the computer at home.

Arrows 48*a* and 48*b* are placed to the left and right of cube 44, respectively. These arrows are shown in phantom to indicate that they are normally invisible, but are displayed when the user's mouse arrow is placed proximate the cube 44. These arrows can be used to rotate the cube to display additional desktops, as will be discussed in connection with FIGS. 6*a*–*d*.

The bitmaps for the faces may be acquired in a number of ways. A Customize dialog box (shown in FIG. 7*d*) allows the user to select from a plurality of image or icon files on the computer or network. Additionally, in the preferred embodiment, the user can select a portion of the desktop or other image using a software tool and drag-and-drop the selection to an exposed face of the cube to set its image (shown in FIG. 7*e*). Other examples of bitmaps which would be appropriate would be a bitmap from a digitized image of a person's face for his or her main desktop, an airplane icon for a desktop containing programs used during travel, and so on.

Figure 4:
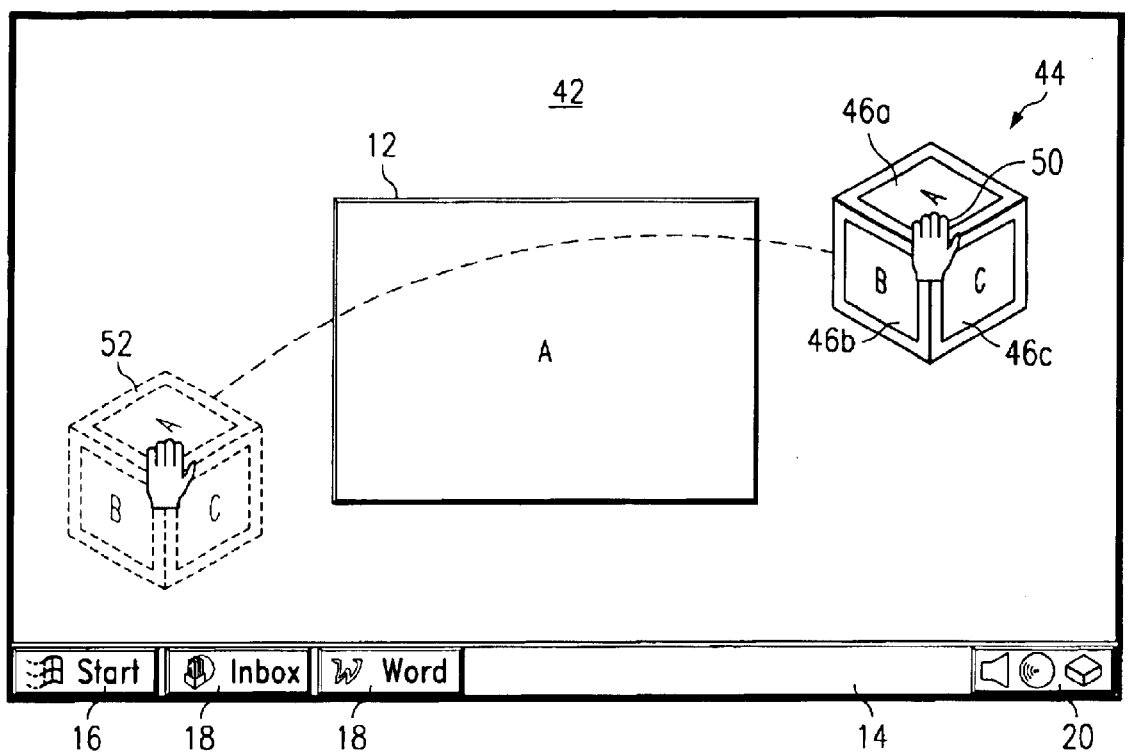
FIG. 4 illustrates movement of the cube on a desktop.

FIG. 4 illustrates a preferred method of moving the cube 44 on the desktop 42. When the cursor is placed proximate the intersection of the three cube faces 46, it turns into a hand 50 (or other appropriate cursor shape), indicating that the mouse (or other user input device) is positioned properly to move the cube 44. As the mouse is moved by clicking and holding on the left mouse button and dragging on the mouse, an image 52 (such as a 50% transparent image or an outline) of the cube 44 moves across the screen. When the left mouse button is released, the position of the cube moves to the location where the transparent image was located at the time of the release.

In operation, the user may move the cube 44 to various positions on the screen not covered by an active application window. Also, in the preferred embodiment, the user can optionally set the cube so that it is always on top of the desktop (i.e., the topmost application window will not cover the cube 44).

Figure 5A:
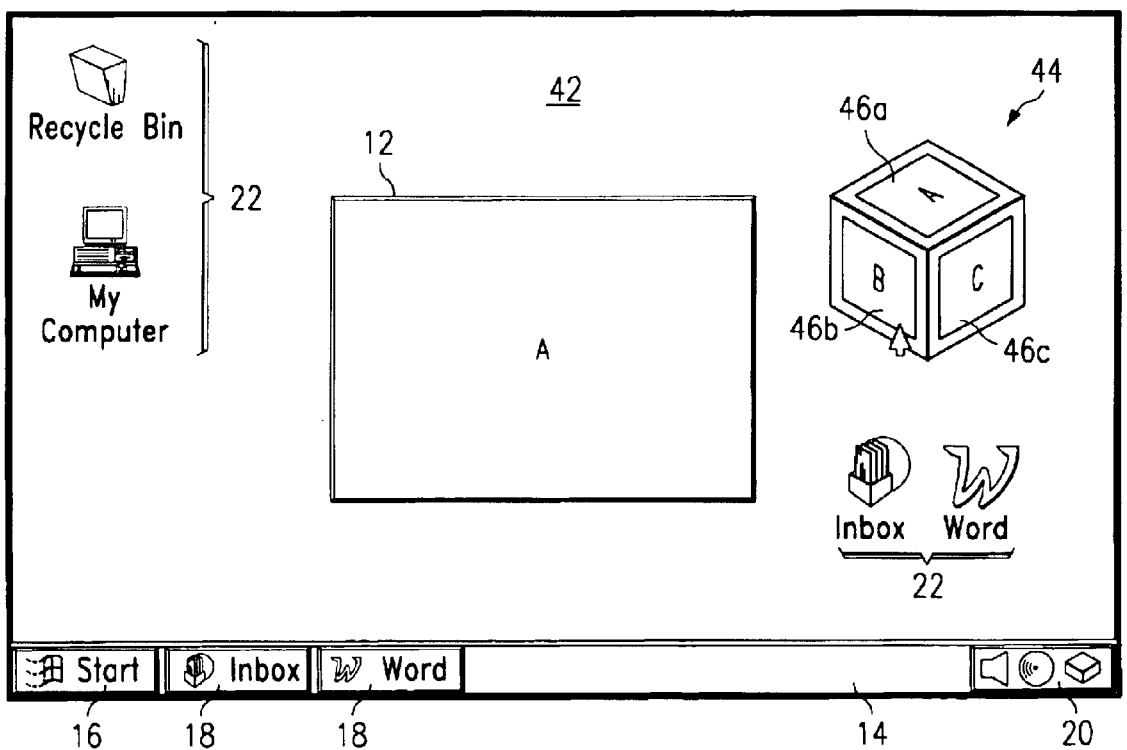
FIGS. 5a and 5b illustrate use of the cube to select a desktop.
Figure 5B:
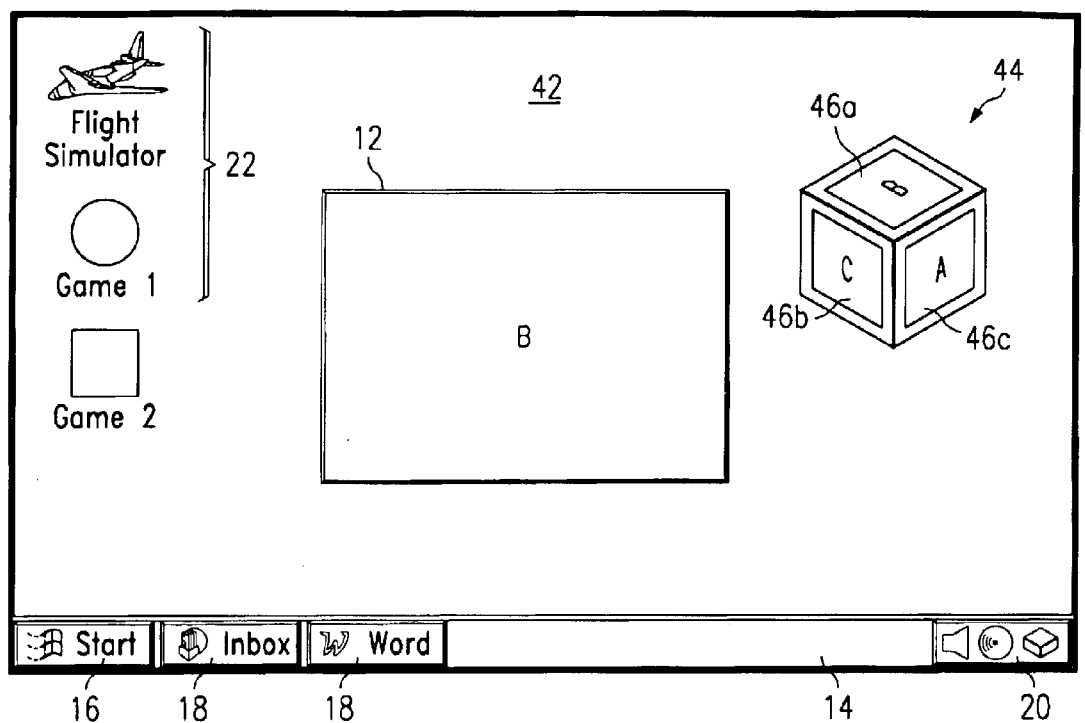

FIGS. 5*a* and 5*b* illustrate how the cube can be used to switch desktops 42. In FIG. 5*a*, the "A" desktop is active, as indicated by face 46*a* of the cube 44. Consequently, the icons, wallpaper and color scheme associated with the "A" desktop are displayed to the user. By placing the cursor over the face 46*b* of the cube 44, the "B" desktop is selected by clicking on the left mouse button. Similarly, the "C" desktop could have been selected by clicking on the left mouse button while the cursor was placed over face 46*c*.

FIG. 5*b* illustrates the result of the desktop switch initiated in FIG. 5*a*. The desktop elements associated with the "B" desktop appear and the bitmap associated with the "B" desktop is placed on the active desktop face 46*a*. The bitmap associated with the "C" desktop moves to face 46*b* and the bitmap associated with the "A" desktop moves to face 46*c*.

Figure 6A:
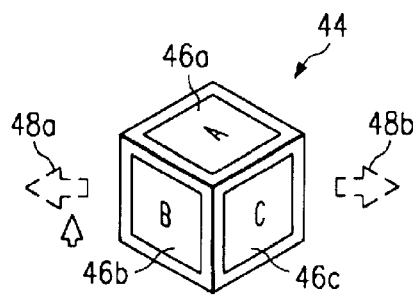
FIGS. 6a, 6b, 6c and 6d illustrate rotation of the cube to expose additional desktops.
Figure 6B:
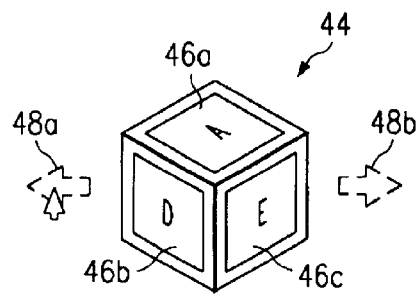

FIGS. 6*a*–6*d* illustrate rotation of the cube to expose additional desktop bitmaps. When the user moves the cursor to within a predetermined number of pixels of the right or left of the cube 44, the rotation arrows 48*a* and 48*b* appear. By clicking on the left arrow, desktop images rotate to the left to show two additional desktop bitmaps, as shown in FIG. 6*b*.

As a result of a click on left rotation arrow 48*a*, the bitmaps associated with desktops "B" and "C" are replaced with the bitmaps associated with desktops "D" and "E", respectively. The bitmap for desktop "A" remains on the active desktop face 46*a*, since rotation of the cube 44 by itself does not affect the active desktop.

Figure 6C:
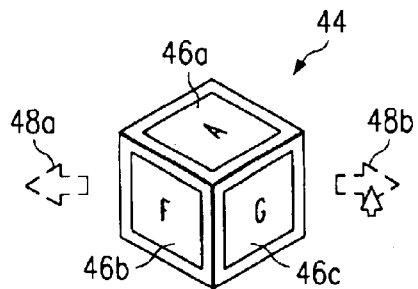
Figure 6D:
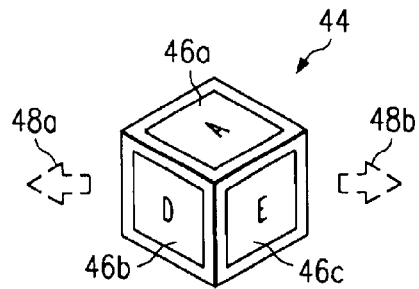

In FIG. 6*b*, the left rotation arrow 48*a* is again clicked with the left mouse button, resulting in movement of the bitmaps for desktop "F" and "G" being displayed on the faces 46*b* and 46*c* respectively. This orientation of the cube is shown in FIG. 6*c*. By left-click on the right rotation arrow 48*b*, the bitmaps corresponding to desktops "D" and "E" are restored to faces 46*b* and 46*c*, respectively.

In operation, a user can quickly cycle through multiple desktops using the left and right rotation arrows. Each face shows a bitmap chosen by the user to identify the desktop. If a bitmap does not readily identify a desktop, the name of the desktop can be seen by locating the cursor over that face for a predetermined amount of time. No matter how many desktops are supported by the cube 46, the bitmaps remain the same size. Further, no space on the taskbar is used.

FIGS. 7*a*–7*j* illustrate menu functions accessed by right-clicking on the cube 44. When a user performs a right click on the cube, a menu 54 appears, headed by the name of the desktop (shown in FIG. 7*a* as "My Games") selected by the user. The user may right-click on either the active desktop face 46*a* or one of the desktop represented on faces 46*b* or 46*c*.

Figure 7A:
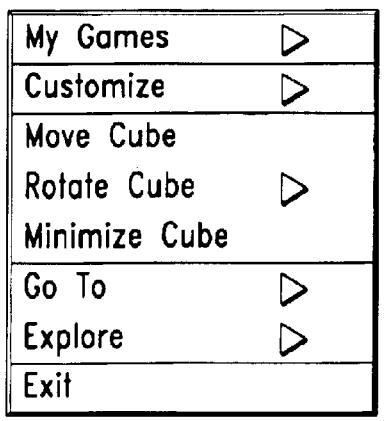
FIGS. 7a–7j illustrate control of the graphical user interface through menu selections.
Figure 7G:
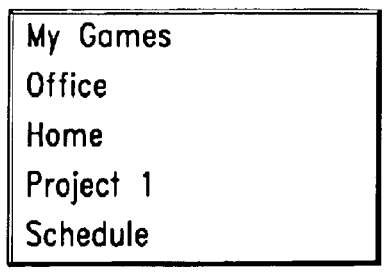
Figure 7B:
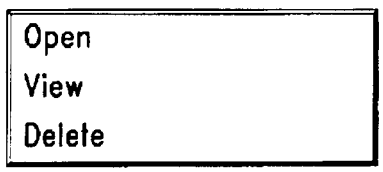

By pressing the desktop name (i.e., My Games), the submenu 55 shown in FIG. 7*b* appears. The "Open" menu choice is used to open the named desktop (if such desktop is not already the active desktop). The View menu choice allows the user to see a directory listing of the named desktop, similar to the "Explore" menu choice (from which the user may select any desktop), described below. The "Delete" menu choice removes the desktop information associated with the named desktop from the desktop database. If the deleted desktop information corresponds to the active desktop, the active desktop becomes the desktop represented by face 46*b*.

Figure 7H:
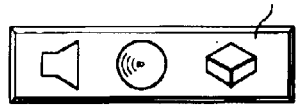
Figure 7C:
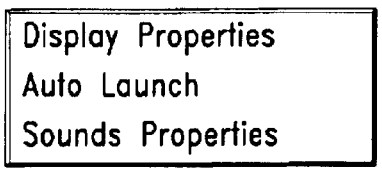
Figure 7I:
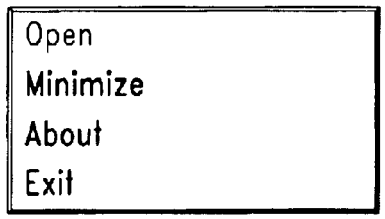

The "Customize" sub-menu choice activates the menu 56 shown in FIG. 7*c*. The Customize sub-menu provides three choices: Display Properties, Auto Launch and Sounds Properties.

The "Auto Launch" menu choice is described in connection with FIG. 10.

The "Sounds Properties" menu choice allows the user to set sounds used for various acts of the cube 44, such as rotation, change of desktop, minimization and maximization.

Figure 7F:
Figure 7J:
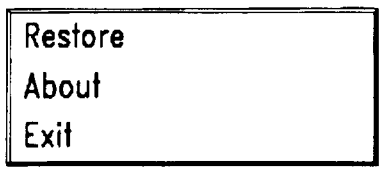
Figure 7D:
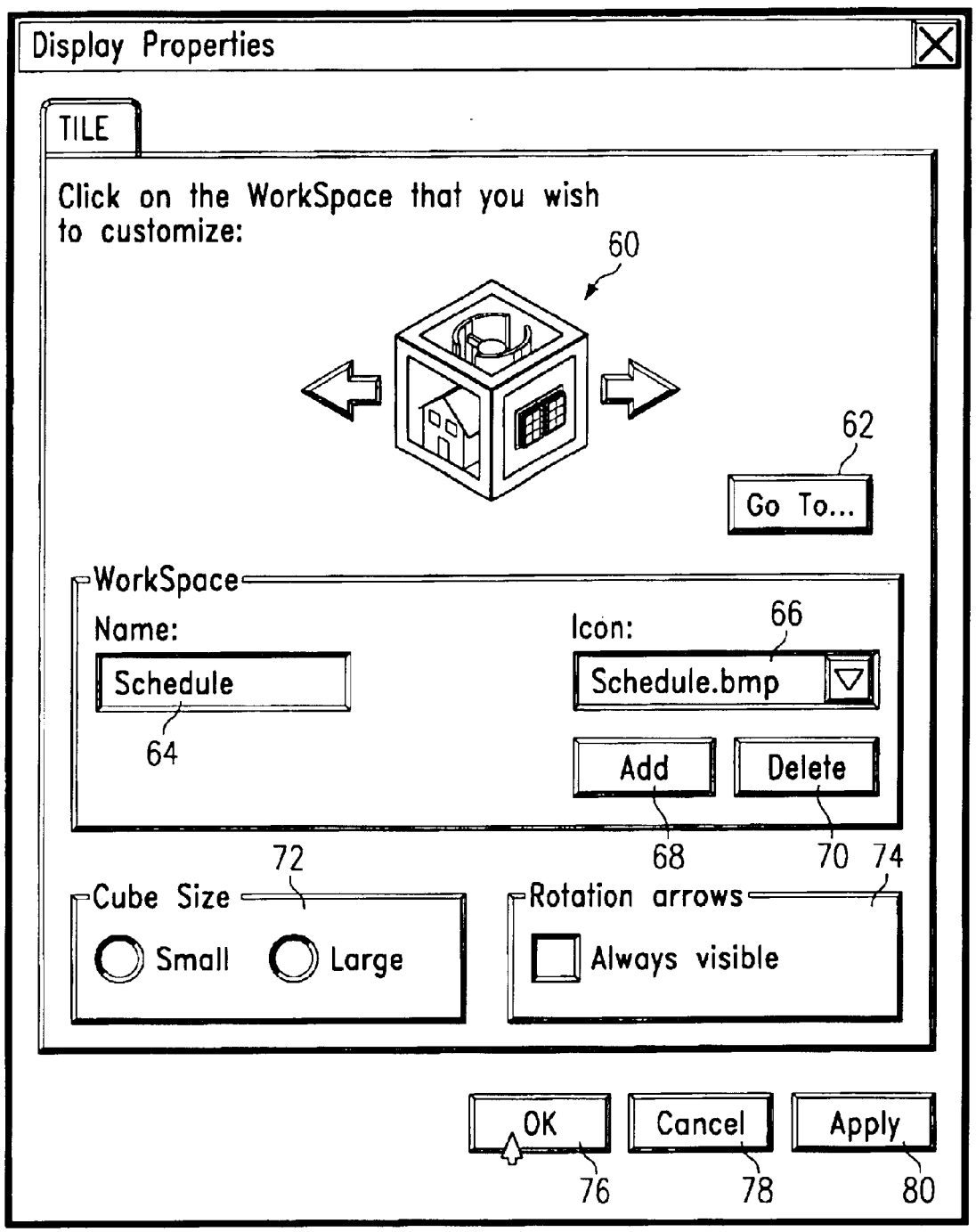

The "Display Properties" menu choice opens the Display Properties dialog box 58, shown in FIG. 7*d*. A representation 60 of the cube 44 and arrows 48*a* and 48*b* is shown at the top of the dialog box 58. This cube representation 60 is interactive to allow the user to select a desktop face using the same cursor movements as selecting a desktop. Alternatively, a desktop can be chosen through the GoTo button 62, which provides a list of all desktop names when it is pressed.

The name (which appears in a box when the cursor is held over the associated face 46 for a predetermined time period) can be set by the user in text box 64. An icon (bitmap file) can be chosen from the drop down box 66. Desktops can be added to or deleted from the list of available desktops using Add and Delete buttons 68 and 70, respectively.

The cube size can be chosen through radio buttons 72. In the preferred embodiment, a large cube is 84×84 pixels in size and a small cube is 32×32 pixels in size. Intermediate sizes could also be provides, as well as a completely scaleable cube. An alternative sizing method would allow the user to interact with the cube 44 on the desktop, for example by pulling on corner tabs associated with the cube 44.

In checkbox 74, the user can choose whether to keep the rotation arrows 48*a* and 48*b* always visible or visible only when the cursor is placed proximate the cube.

The OK button 76 set any changes made by the user. The Cancel button 78 reverts the cube 44 to its state prior to any changes made in the dialog box 58.

The Apply button 80 allows the user to preview changes to the cube 44, but the prior state can be restored by using the Cancel button 78. It should be noted that while the dialog box of FIG. 7d illustrates a number of items which could be configured for each desktop, other properties, such as screen resolution and other environmental settings, could be configured through the Display Properties dialog box 58.

Figure 7E:
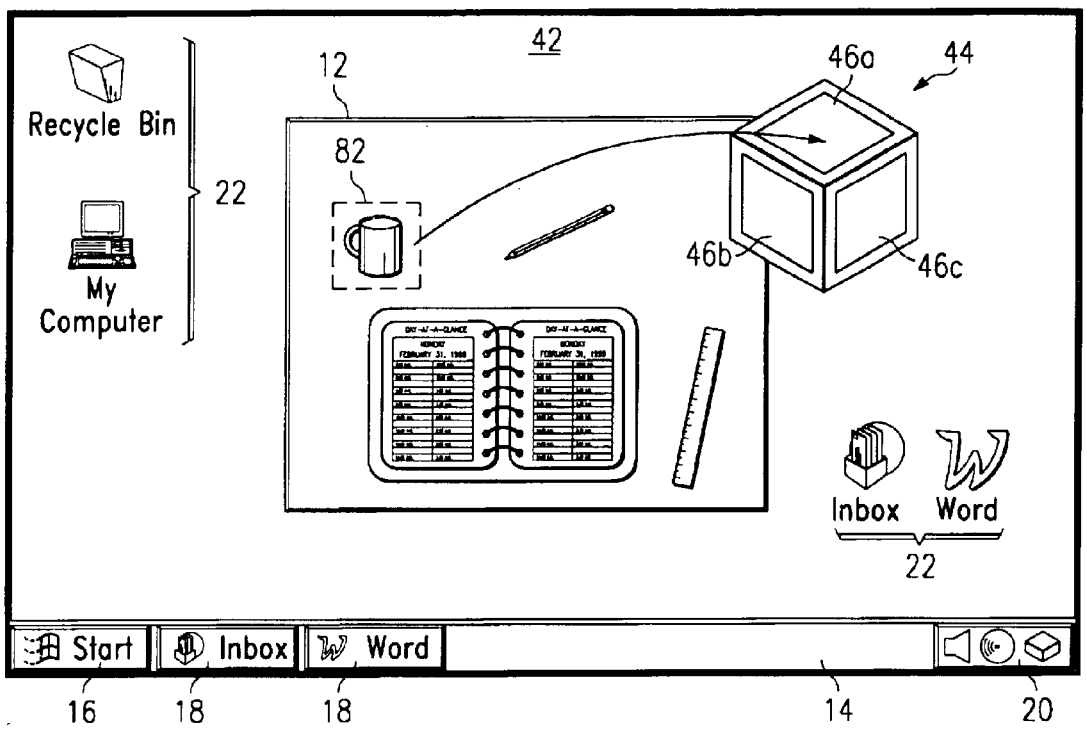

FIG. 7e provides an alternative method for assigning a bitmap to a cube face 46. In this embodiment, the user selects a square area 82 of the display screen. This area may be part of a document or image file displayed in an active application window, a portion of the wallpaper 12, or an icon 22. The user then clicks and drags on the selected area to one of the exposed cube faces 46. The bitmap for that face 46 is then replaced with a bitmap formed from the selected area (the bitmap displayed is transformed to appear angled as dictated by the relevant cube face).

Referring again to FIG. 7a, the "Move Cube" menu choice changes the cursor to a hand, which can grab the cube 44 and move it to any location on the active desktop 42. This procedure is shown in connection with FIG. 4.

The "Rotate Cube" menu choice provides the GoTo submenu 83 shown in FIG. 7f. The cube can be rotated left or right by pressing either the Left or Right menu choices in this submenu.

Returning to FIG. 7a, the Minimize Cube menu choice causes the cube to be removed from the screen but remains as a tray icon 88 in the tray area 20 of the taskbar 14.

FIG. 7g illustrates the "GoTo" submenu 84. The GoTo submenu 84 lists the names of all desktops. When a name is selected, the desktop switched to that selected desktop and the associated bitmap is placed on the active desktop face 46a of the cube 44.

Returning to FIG. 7a, the "Explore" menu choice opens a submenu listing the desktops, as shown in FIG. 7g. When a desktop is selected, the WINDOWS 95 (or other operation system) file manager is executed, set at the directory holding the files located on the selected desktop. Alternatively, a customized view of the desktop settings, files, shortcuts and other environmental settings associated with a desktop could be shown in place of the file manager display. In addition to using the menus to obtain a display of a desktop's contents, the user could interact with the cube 44; for example, the user could double right click on a face 46 to obtain a list of the desktop's contents.

The tray area 20 is shown in FIG. 7h. By left clicking on the cube tray icon 88 while the cube 44 is minimized, the cube 44 is restored to the desktop 42. By right clicking on the cube tray icon 88 while the cube 44 is open (visible on the desktop 44), the menu 90 shown in FIG. 7i appears. From this menu, the user can minimize the cube 44, Exit (terminate the GUI) or determine the version number and related information using the About menu choice. Other actions such as a help program could be added to this menu.

If the user right clicks the cube tray icon 88 while the cube 44 is minimized (i.e., the GUI is running, but the cube 44 is not visible), the menu 92 shown in FIG. 7j is displayed. The cube 44 can be returned to the desktop 42 by pressing the Restore menu selection, or the GUI can be terminated using the Exit menu choice.

Figure 8:
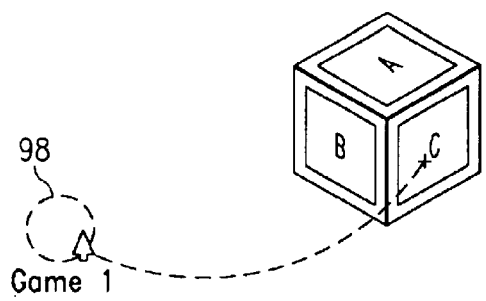
FIG. 8 illustrates use of the cube to move and copy desktop objects between desktops.

FIG. 8 illustrates movement of icons from one desktop to another. To move an icon from an active desktop to another desktop, the cube 44 is rotated to show the destination desktop. The icon is then moved into the face 46 showing the destination desktop using a left-click and drag. In the example shown in FIG. 8, the Game1 icon 98 is copied to the "C" desktop shown on face 46c.

An alternative method is to use a right-click and drag to move an icon into the face 46 associated with a desired destination desktop. A menu will then appear allowing the user to select either "Copy Here" or "Move Here".

Figure 9:
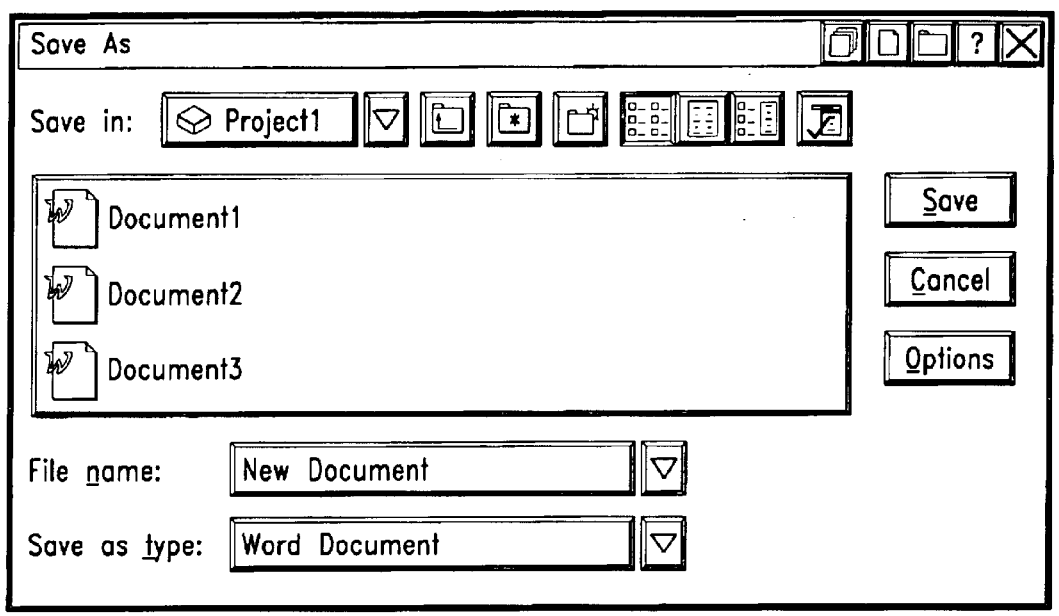
FIG. 9 illustrates a dialog box used to save a document from an active application to a desired desktop.

FIG. 9 illustrates a "Save As" dialog box 99, which can be used to save a document from an application to a particular desktop. The drop down box allows the user to select a desktop name (in this case "Project1"). The file "New Document" is then saved to a directory associated with the selected desktop, and an icon is placed on the desktop which identifies the document. Alternatively, a shortcut file associated with the document can be placed in the selected desktop's directory and a shortcut icon can be placed on the selected desktop.

Figure 10A:
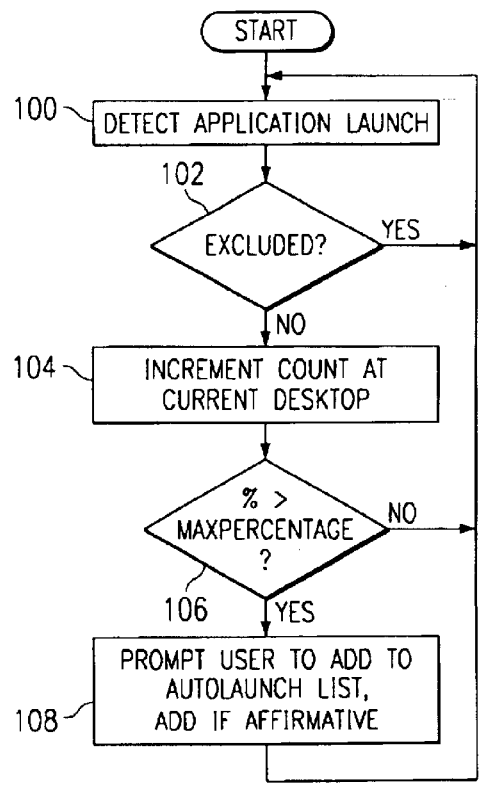
FIGS. 10a and 10b illustrates flow chart describing auto-launch capabilities.
Figure 10B:
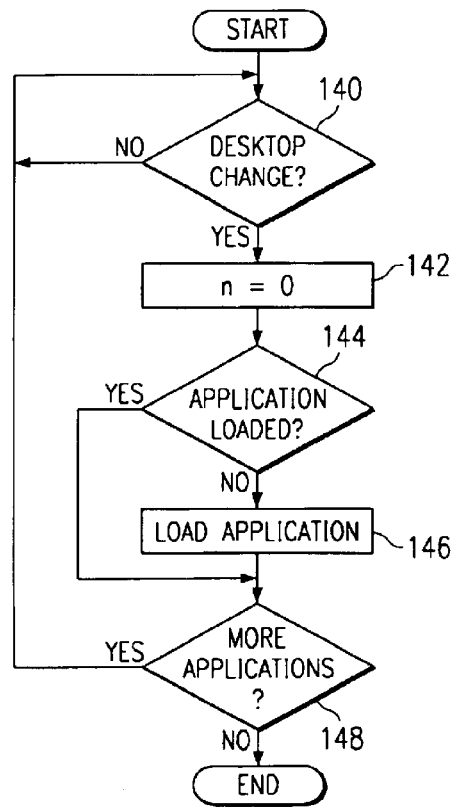

A particular category of response to a desktop switch is autolaunch capability. A flow chart describing operation of the autolaunch GUI is shown in FIGS. 10a–b. FIG. 10a, which illustrates a procedure for counting applications to determine those which are frequently used in each desktop. In block 100, the loading of an application is detected, which in a WINDOWS 95 operating system would be a *.exe, *.com or *.bat file. Other executables, such as *.dll files are not counted, because they are launched by programs rather than directly by users. In decision block 102, the GUI checks to see if a detected program is on a user-defined exclusion list. This allows the user to eliminate programs which may be launched frequently, such as a file manager or an Internet browser, but does not have a particular association with a desktop or other environmental consideration.

If the launched program is not excluded, then a count for that program is incremented with respect to the current desktop in block 104. Thus, if a word processor is launched in the "office" desktop, its count for that desktop is incremented by one. If the same program is loaded in the "home" desktop, then its count for that desktop is incremented.

In decision block 106, the accumulated count is used to determine the percentage of application use per access to the desktop. This percentage is compared to a user defined threshold, Maxpercentage. If the program is used in the desktop at a rate which exceeds Maxpercentage, the user is prompted as to whether the application should be placed in an autolaunch list for the current desktop. If the user replies affirmatively, the application name is placed on an autolaunch list for the current desktop.

FIG. 10b illustrates a flow chart describing how applications are automatically launched. In block 110, the GUI detects when a user has changed desktops. In blocks 112, 114, 116 and 118, the GUI loads each application specified in the autolaunch list for the new desktop (the application may prompt the user to verify that he or she would like the applications to be loaded). If an application is already running, it will not be loaded (see decision block 114).

While the autolaunch capabilities of the GUI have been discussed in relation with loading applications upon the change of a desktop, it could also be tied to controlling other environmental resources responsive to a desktop change. For example, the autolaunch capabilities could be used to change default printers or change screen resolution upon entering a desktop. Further, the autolaunch GUI could track loading of files other than application program, such as documents. Thus, if a particular spreadsheet was loaded each time the "Project1" desktop was entered, the document as well as the spreadsheet application program.

Figure 11:
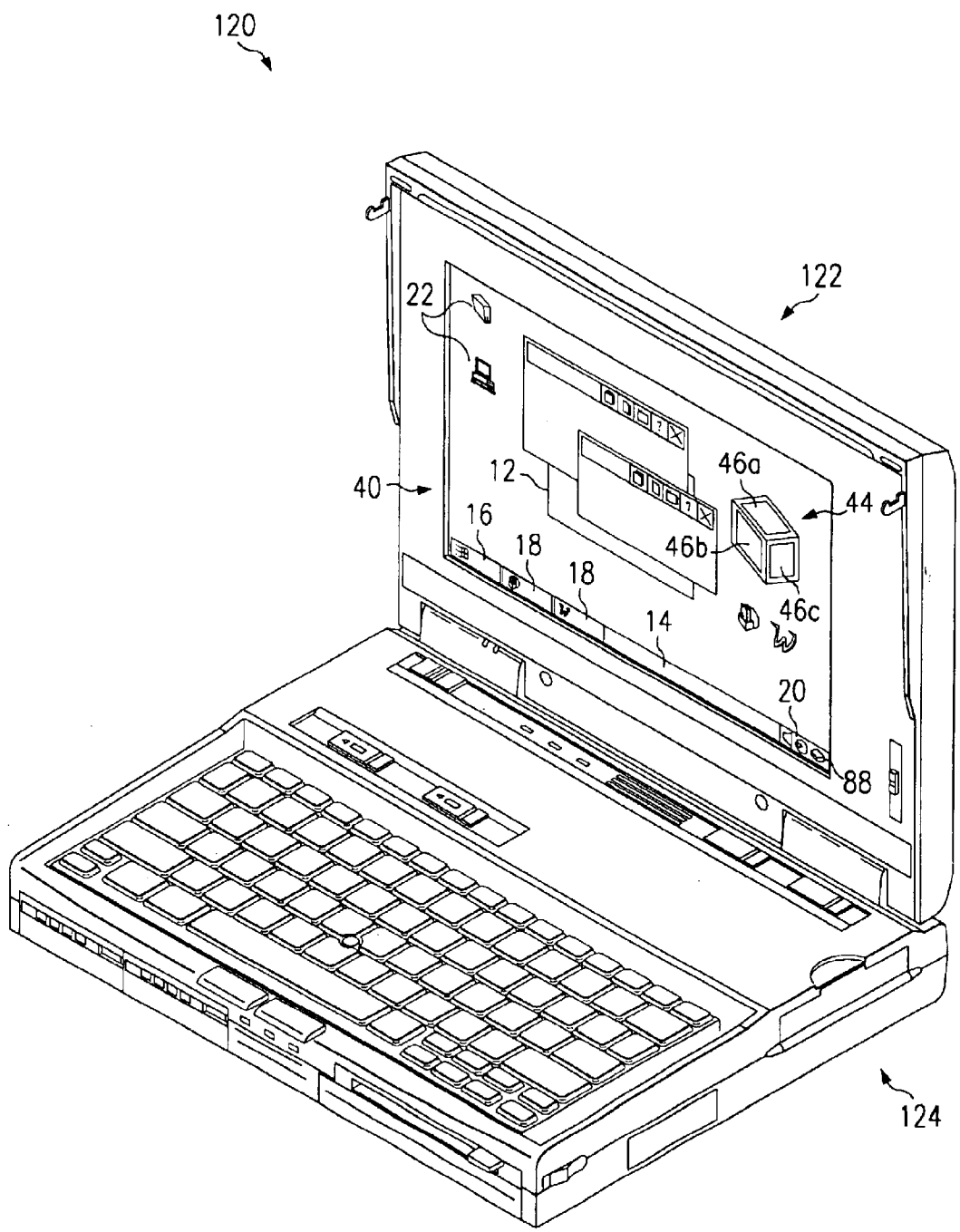
FIG. 11 illustrates a computer performing the GUI.

FIG. 11 shows the GUI 40 on a computer 120. The computer includes a display 122 and processing circuitry 124 for executing the GUI as described above along with the operating system and application software. Processing circuitry 124 would include, for example, one or more processors, mass storage circuitry, such as a hard drive, a video/graphics controller, input/output circuitry and high speed memory, such as semiconductor memory.

The present invention provides significant advantages over the prior art. First, the GUI present an easy and intuitive approach to using multiple desktops. Second, the GUI can support an unlimited number of desktops without reducing the resolution and, hence, visual impact of the bitmaps representing the desktops.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A method of switching desktops on a computer comprising the steps of:
    displaying a representation of a polyhedron having a plurality of faces shown on the computer's display;
    displaying images on said faces, each image associated with a respective desktop;
    changing desktops responsive to user interaction with said faces.

2. The method of claim 1 wherein said step of displaying a representation of a polyhedron comprises the step of displaying a representation of a cube having three faces shown on the computer's display.

3. The method of claim 1 and further comprising the step of rotating said representation of the polyhedron to show additional faces having images displayed thereon, each image associated with a respective desktop.

4. The method of claim 3 wherein said step of rotating comprises the steps of:
    displaying rotation objects proximate said representation of said polyhedron; and
    rotating said representation of polyhedron responsive to user interaction with said rotation objects.

5. The method of claim 4 wherein said step of displaying rotation objects comprises the step of displaying rotation objects responsive to the user locating a cursor proximate said polyhedron.

6. The method of claim 1 wherein said step of displaying images comprises the step of displaying user selected images on said faces.

7. The method of claim 6 and further comprising the step of capturing an image to be displayed on a face of said polyhedron responsive to the user defining an area on said screen.

8. The method of claim 1 and further comprising the step of moving an icon from a current desktop to another desktop responsive to the user dragging the icon from the current desktop to a face of said polyhedron.

9. A method of controlling a plurality of desktop configurations on a computer comprising the steps of:
    displaying a representation of a polyhedron having a plurality of faces shown on the computer's display;
    displaying images on said faces, each image associated with a respective desktop;
    displaying a current desktop represented by a predetermined one of said faces; and
    interactively maintaining said desktops responsive to user interaction with said faces.

10. The method of claim 9 wherein said interactively maintaining step includes the step of moving an icon from said current desktop to another desktop responsive to the user dragging the icon from the current desktop to a face of said polyhedron.

11. The method of claim 9 wherein said interactively maintaining step includes the step of switching desktops responsive to the user interaction with one of said faces.

12. The method of claim 11 and further comprising the step of providing a menu responsive to user interaction with said polyhedron.

13. The method of claim 12 and further comprising the step of allowing the user to select a desktop name for each face of the polyhedron.

14. The method of claim 12 and further comprising the step of allowing the user to select an image for each face of the polyhedron.

15. The method of claim 9 and further comprising the step of allowing the user to select an image for one of said faces of said polyhedron by selecting a section of the display and moving said section to said one of said faces.

16. The method of claim 9 wherein said step of interactively maintaining said desktops includes the step of rotating said polyhedron responsive to user interaction with said polyhedron to expose additional faces.

17. A computer comprising
    a display;
    processing circuitry for:
        executing a plurality of applications;
        displaying a plurality of desktops, each desktop having an associated set of icons related to said applications;
        displaying a representation of a polyhedron having a plurality of faces shown on the display;
        displaying images on said faces, each image associated with a respective desktop;
        changing desktops responsive to user interaction with said faces.

18. The computer of claim 17 wherein said processing circuitry displays a representation of a polyhedron by displaying a representation of a cube having three faces shown on the computer's display.

19. The computer of claim 17 wherein said processing circuitry further rotates said representation of the polyhedron responsive to user interaction with said polyhedron to show additional faces having images displayed thereon, each image associated with a respective desktop.

20. The computer of claim 19 wherein said processor rotates said polyhedron by:
    displaying rotation objects proximate said representation of said polyhedron; and
    rotating said representation of polyhedron responsive to user interaction with said rotation objects.

21. The computer of claim 20 wherein said processing circuitry displays rotation objects by displaying rotation objects responsive to the user locating a cursor proximate said polyhedron.

22. The computer of claim 17 wherein processor circuitry displays user selected images on said faces.

23. The computer of claim 22 and wherein a selected image is defined by capturing an image to be displayed on a face of said polyhedron responsive to the user defining an area on said screen.

24. The computer of claim 17 wherein said processor further moves an icon from a current desktop to another desktop responsive to the user dragging the icon from the current desktop to a face of said polyhedron.

25. A method of switching desktops on a computer comprising the steps of:

displaying a representation of a polyhedron having a plurality of faces shown on the computer's display;

displaying a single image on each of said faces, each image associated with a respective desktop;

changing desktops responsive to user interaction with said faces.

26. A method of controlling a plurality of desktop configurations on a computer comprising the steps of:

displaying a representation of a polyhedron having a plurality of faces shown on the computer's display;

displaying a single image on each of said faces, each image associated with a respective desktop;

displaying a current desktop represented by a predetermined one of said faces; and interactively maintaining said desktops responsive to user interaction with said faces.

27. A computer, comprising:

a display; and processing circuitry for:

executing a plurality of applications;

displaying a plurality of desktops, each desktop having an associated set of icons related to said applications;

displaying a representation of a polyhedron having a plurality of faces shown on the display;

displaying a single image on each of said faces, each image associated with a respective desktop;

changing desktops responsive to user interaction with said faces.

28. A method of controlling a plurality of desktop configurations on a computer comprising the steps of:

displaying a representation of a polyhedron having a plurality of faces shown on the computer's display;

displaying a single image on each of said faces, each image associated with a respective desktop;

displaying an active desktop represented by a predetermined one of said faces concurrent with said displaying a representation of a polyhedron having a plurality of faces shown on the computer's display; and interactively maintaining said desktops responsive to user interaction with said faces.

29. A computer, comprising:

a display; and processing circuitry for:

executing a plurality of applications;

displaying a plurality of images on a polyhedron, each image representing a respective desktop, each desktop having an associated set of icons related to said applications;

displaying an active desktop represented by a predetermined one of said images concurrent with said displaying a representation of a polyhedron having a plurality of images shown on the computer's display;

changing desktops responsive to user interaction with said images.

* * * * *